J. HARTNESS.
SUN DIAL.
APPLICATION FILED FEB. 8, 1915.

1,209,289.

Patented Dec. 19, 1916.
8 SHEETS—SHEET 1.

J. HARTNESS.
SUN DIAL.
APPLICATION FILED FEB. 8, 1915.

1,209,289.

Patented Dec. 19, 1916.
8 SHEETS—SHEET 5.

Witnesses:
Inventor:

J. HARTNESS.
SUN DIAL.
APPLICATION FILED FEB. 8, 1915.

1,209,289.

Patented Dec. 19, 1916.
8 SHEETS—SHEET 6.

Witnesses:
A. L. Folsom
F. R. R. Onletene

Inventor:
James Hartness
by Wright & Brown Lumby & May
Attys.

Fig. 25.

UNITED STATES PATENT OFFICE.

JAMES HARTNESS, OF SPRINGFIELD, VERMONT.

SUN-DIAL.

1,209,289.  Specification of Letters Patent.  Patented Dec. 19, 1916.

Application filed February 8, 1915. Serial No. 6,910.

*To all whom it may concern:*

Be it known that I, JAMES HARTNESS, a citizen of the United States, and a resident of Springfield, in the county of Windsor and State of Vermont, have invented certain new and useful Improvements in Sun-Dials, of which the following is a specification.

This invention has relation to sun dials and has for its object to provide a construction having means for adjusting or moving the dial around the gnomon to compensate for the variation between sun time and mean time, and in which the said adjusting means may be operated by a person without special training or experience.

According to my invention, I employ an index and a calendar wheel, so that the adjustment of the wheel to a predetermined point with reference to the index varies the angular position of the gnomon and dial in relation to the sun in such way as to effect a correction for the equation of time. In prior sun dials, in which the parts are adjusted to compensate for the equation of time, the adjustment is accomplished by means difficult to comprehend and inconvenient to use.

The invention is capable of various embodiments, and I have selected for illustration and description several forms of sun dials which will serve the purpose of disclosing the principles of construction and operation of the invention. In all of these constructions, the dial, which is provided with a scale having graduations showing the hours and minutes, is so moved or adjusted that the mean time may be obtained by noting the position of the shadow of the gnomon on the scale. In two of these instruments, the position of the dial is controlled by calendar-bearing cams suitably formed to secure the requisite oscillation by steadily rotating the cam step by step with reference to a stationary pointer or index, whereas in the third instrument the oscillation is secured by means of a gear segment, and a spindle carrying a gear to intermesh with the segment and a double end pointer or index. In the latter instrument, an irregular motion is secured by moving the pointer or index back and forth as indicated by the dates on a stationary circular calendar plate. Means are provided in each of the instruments for tilting the dial to fit any latitude, the first two mentioned dials being shown as provided with graduations for north latitude, which would have to be reversed for south latitude in case the instruments were intended for a location at any very great distance from the equator.

In each of the instruments, the gnomon is tapered toward the middle to offset or compensate for the change in angular position of the shadow, due to the sun shining over that part of the gnomon more distant from the graduations on the hour scale, for it will be readily understood that a cylindrical gnomon (*i. e.* one having a uniform diameter) would indicate by its shadow a different time, with the sun at either the northern or the southern position, than it would in its position at the equinox due to the greater distance of the effective part of the gnomon from the graduations on the scale.

Referring now to the drawings.

The essential features of a sun dial are the dial and the gnomon so related that the shadow cast by the gnomon travels along the scale on the dial. In two of the instruments which I have illustrated upon the drawing, the dial takes the form of a hollow frusto-cone with the gnomon located in the axis thereof, but it is obvious that the dial may be semi-cylindrical as in Fig. 23, or may be formed as a flat plate or in various other ways without departing from the spirit and scope of the invention. Means are provided by which the gnomon and dial may be adjusted for the latitude of the locality wherein the sun dial is to be used, means being provided preferably for a universal adjustment of both the dial and the gnomon as a unit. For the purpose of compensating the equation of time, I provide means which may be manually adjusted from time to time, for the purpose of adjusting the dial in its horizontal plane, with the result that the readings from the sun dial will indicate mean time rather than sun or apparent time. To compensate for the fractional excess of the length of the year above 365 days, an additional adjustment is provided.

Figures 1, 2, 9:
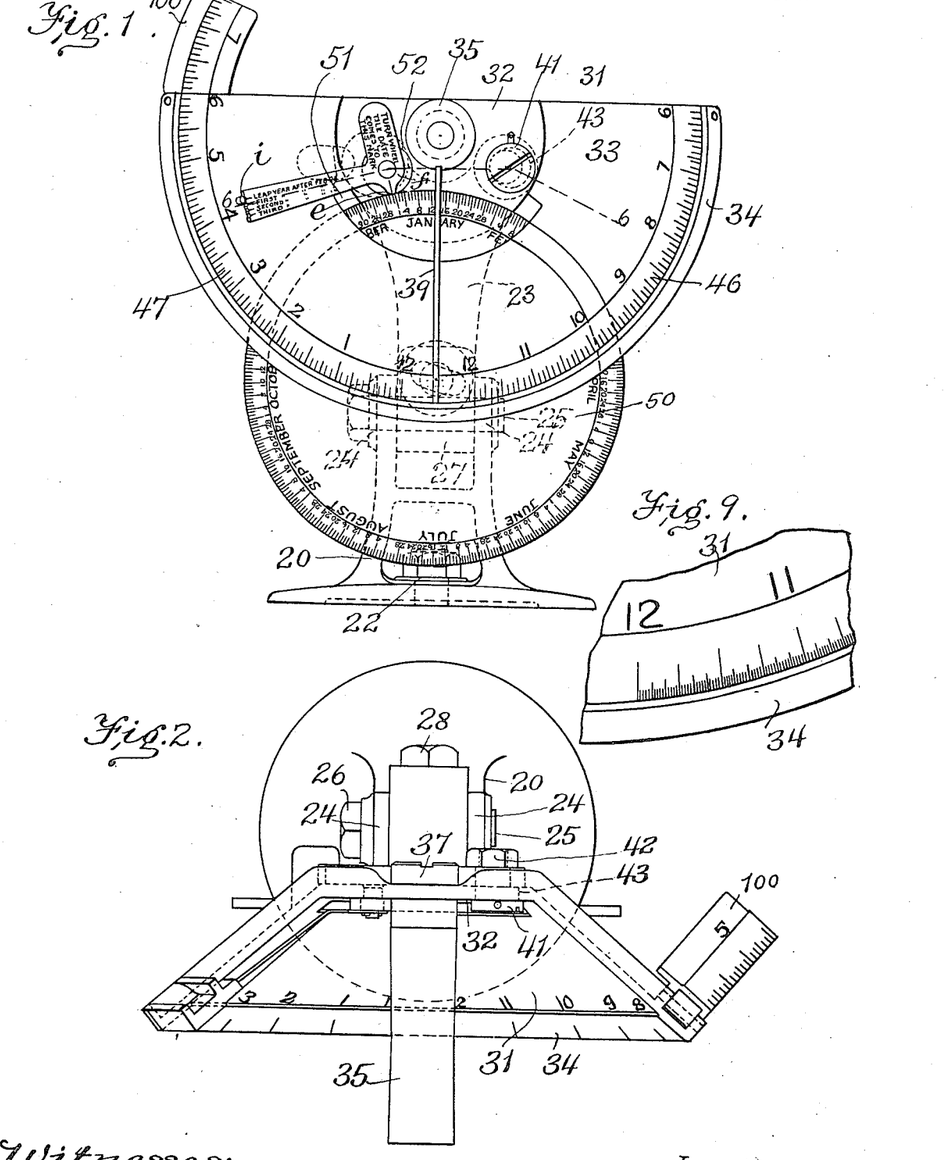
Figure 1 illustrates in front elevation a sun dial embodying the invention.
Fig. 2 represents a plan view of the same. In these two figures the parts are positioned for a position at the equator.
Fig. 9 represents a portion of the dial scale.

Referring now to Figs. 1 to 9 inclusive of the drawings, the sun dial as a whole is shown as provided with a standard 20 having a base 21 adapted to be secured upon a column or pedestal by any suitable sort of a fastening, such for instance as a bolt 22 passing through an aperture arranged in the axis or median line of the standard. The standard supports a head which is indicated at 23 and which has preferably a universal adjustment. Any suitable means for providing this adjustment may be utilized, as by providing the standard with ears 24 to receive a bolt pintle 25 provided with a nut 26. Pivoted upon the pintle 25 is the block 27 to which the head 23 is secured by the screw 28 which also operates as a pintle. The two pintles 25 and 28 have their axes in planes forming a right angle, so that, after the standard has been fixed upon a column or pedestal at approximately the proper angle, the head may be adjusted in any direction. The head has two ears or lugs 29 and 30 into which the screw 28 is passed, the head being kept in place after adjustment by tightening the screw so as to draw the ears or lugs tightly against the faces of the block 27; and the block in like manner is held in the position to which it is adjusted by tightening the nut 26 on the bolt 25. As shown in Fig. 1, the end of the head 23 is bifurcated or yoke-shaped to provide two arms, its upper surface being flat so as to support the under face of the dial as will be explained.

The dial may be shown as in the form of a hollow frusto-cone as indicated as a whole at 31. It has a base portion 32 with a flaring side wall 33 terminating at its edge in an outwardly and downwardly turned flange 34, see Fig. 5. Projecting from the exact center and alined with the axis of the dial is the gnomon which is indicated at 35. This is shown as consisting of a hollow post having a reduced lower threaded end 36 which is passed through the base portion 32 of the dial and secured in place by a nut or collar 37. The gnomon is exactly perpendicular to the base portion of the dial, and it slightly tapers from its ends toward its middle portion as before explained. Since only the upper half of the gnomon is effective (that is, the portion above a plane passing through the axis of the gnomon at right angle to the rays of the sun at 12 m.), the lower half of the gnomon might be omitted without affecting the shadow for reading time by the shadow on the hour scale. Preferably a thin web or plate 39, formed on or secured to the flaring wall of the dial, extends into a slot in the side of the gnomon, and serves as a curtain to complete the shadow of the gnomon.

Figures 3, 4, 5:
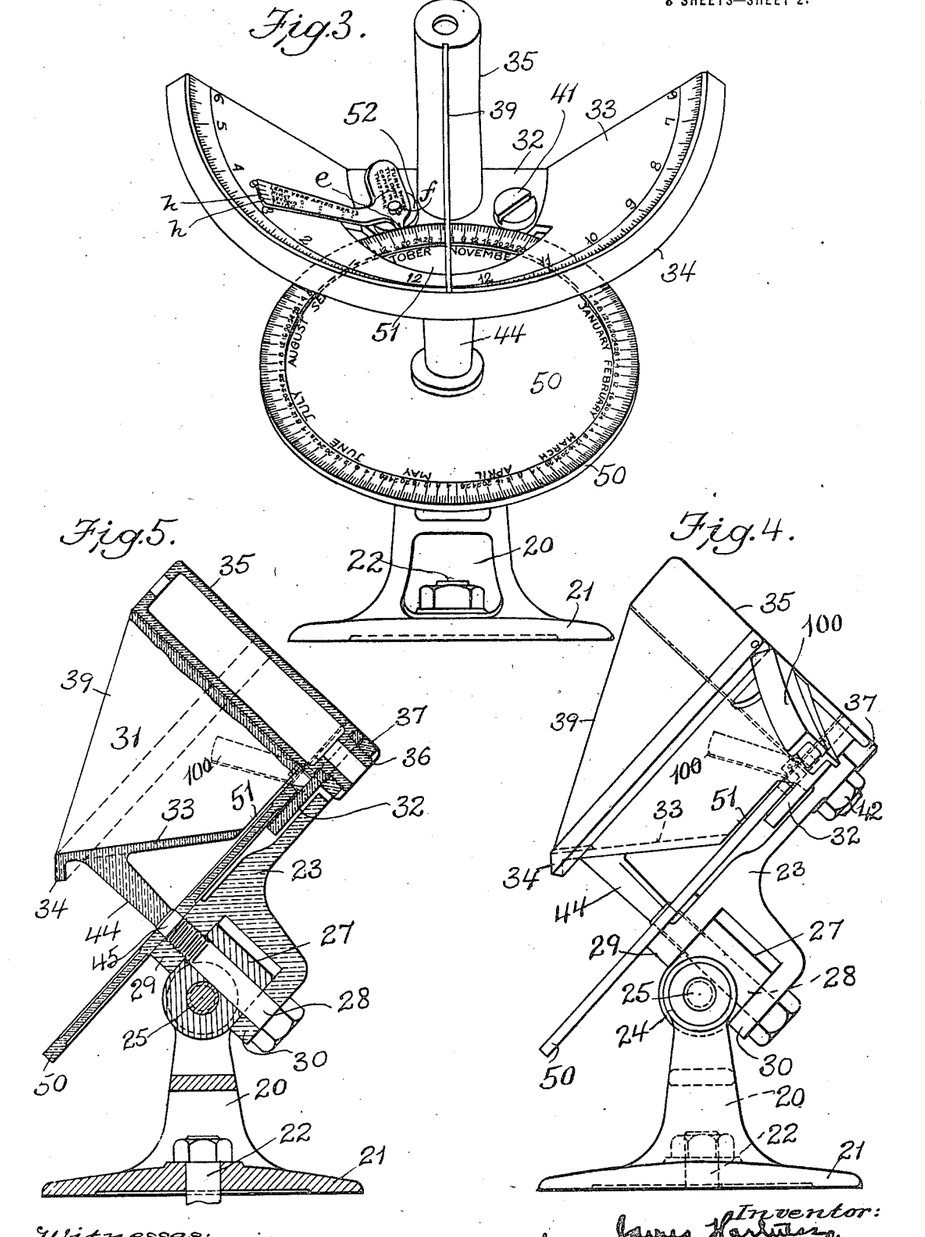
Fig. 3 represents a front elevation of the sun dial positioned for about the latitude of Springfield, Vermont.
Fig. 4 represents a side elevation of the same.
Fig. 5 represents a vertical front-to-rear section.

The dial is supported by the head but is capable of adjustment relatively thereto. To this end, there is passed through the base portion 32 of the dial a pivot screw 41 which passes through one of the arms of the head and is held in place by a nut 42. This pivot screw is provided with an eccentric portion 43 which fits in a round aperture in the base 32 of the dial, so that, by rotating the screw, the dial may be adjusted. As further shown in Fig. 6, the base of the dial rests upon the upper face of the head, but, in the event that further support is needed, the wall 33 of the dial may be formed or provided with an external projection 44 to rest upon the unthreaded end 45 of the screw 26, as shown in Fig. 5. The axis of the pivot 41 is parallel to and somewhat remote from the axis of the gnomon, so that, although by swinging the dial about the pivot, the gnomon is adjusted or moved therewith, the result is a variation in the angularity of the gnomon and the dial, just as though the gnomon were stationary and the dial rotated about the axis thereof. The sides of the gnomon provide two styles so that the scale on the dial must be formed in two separated portions as is usual with the ordinary sun dial. As shown in Fig. 1, the two portions of the hour scale are indicated at 46 and 47. On this scale, on which the shadow of the gnomon falls, are indicated the hours, the minor divisions indicating a difference of five minutes in time, but, as shown in Fig. 9, the spaces allotted for the hours may be divided into minutes. On the scale, the two lines indicated at 12, 12 are equal to the width of the shadow cast by the gnomon, so that, when the sharp edges of the shadow coincide with these two lines, the sun is at the meridian.

In the morning the western limb of the sun is the effective part that determines the position of the shadow, and in the afternoon the eastern limb is the effective part. This changing from one side to the other makes it necessary to have two portions 46, 47 of the hour scale two minutes closer together than would be the case were the sun a point light, or if the entire orb were used as the illuminant, as where the sun is permitted to shine upon the scale through a small aperture or past both sides of a spindle-shaped gnomon.

For use in the summer time in the higher latitudes, the dial may be provided with hinged extensions 100, to provide continuations of the hour scale for early morning and late evening.

Figures 6, 7:
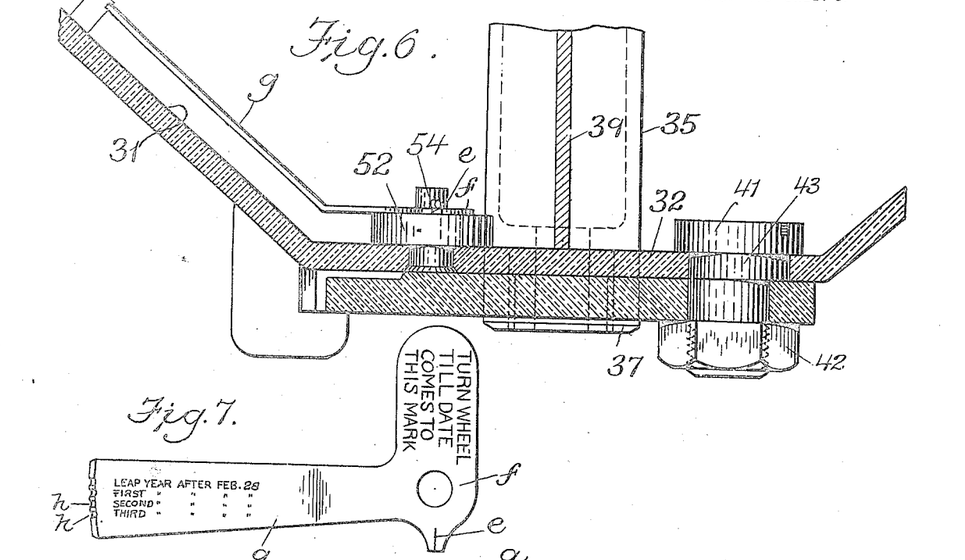
Fig. 6 represents a transverse section on the line 6—6 of Fig. 1, the parts being shown on a larger scale.
Fig. 7 illustrates the index lever which is adjustable for annual variations between mean time and apparent time.
Figure 8:
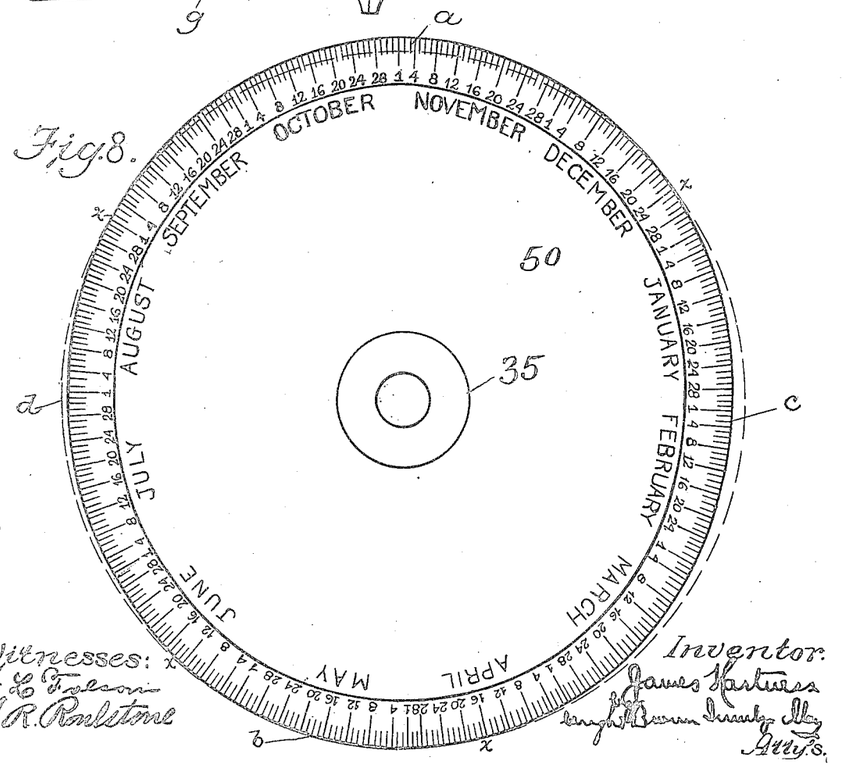
Fig. 8 illustrates the cam disk by which the dial is adjusted for diurnal variations.

Having actually determined the latitude and longitude of the locality where the sun dial is to be placed, and having adjusted the head so that the gnomon is in the plane of the meridian of longitude and at an angle corresponding to the latitude of the locality, and having adjusted the dial so that at noon on the 21st day of March the shadow exactly indicates 12 o'clock, the dial might remain fixed so that the solar time would be indicated throughout the year in the ordinary way in which it is indicated by the usual sun dial commonly found in gardens; but, in order that compensation may be made for the equation of time, I provide means for adjusting the dial day by day. According to the embodiment of the invention illustrated in Figs. 1 to 9, this means consists of a rotatable calendar wheel formed as a disk cam 50 which is mounted to rotate about the unthreaded end 45 of the screw 28, which screw has its axis in exact parallelism with the axis of the gnomon. The calendar wheel projects through an aperture 51 formed in the flaring wall of the dial and overlaps the base 52 of the dial as clearly shown. On its face, the disk bears a scale representing the twelve months of the year and the division of each month into days, according to the number allotted thereto in the modern calendar, the month of February being provided with only 28 days. In this case, the distances between the graduated lines for the days are equal. The dial, which as I have explained is pivoted upon the pivot 41, is provided with a roll 52, on the opposite side of the gnomon from the pivot, which bears upon the peripheral edge of the cam disk 50. This roll, as shown in Fig. 6, is journaled upon a stud 54. The calendar wheel 50, which is substantially disk-shaped, is, however, not a true disk, as indicated by its variation therefrom in Fig. 8, the dotted lines representing a true circle. The true circle coincides with the cam-like periphery on April 15, June 15, September 1, and December 24, on which days solar time and mean time are in approximate agreement. Roughly speaking, however, between September 1 and December 24, solar time is fast as compared with mean time; whereas from December 24 to April 15, and from June 15 until September 1 apparent time is slow as compared with mean time. Between April 15 and June 15 there is not a great variation between mean time and apparent time, although apparent time is slightly slow with respect to mean time. This may be readily understood by the layman by examining any almanac where the difference between mean time and solar time is usually tabled either as "sun fast," "sun slow," or "clock fast," "clock slow." It will be noted that what may be called the projections of the cam, indicated at $a$ and $b$, and depressions indicated at $c$ and $d$, are so shaped for the days and months of the year on the corresponding scale that, as the calendar wheel is rotated through equal arcs day by day, the dial will be positioned thereby to compensate for the equation of time on any day so that the reading will be given in mean time rather than in apparent time or solar time. Thus an adjustment is provided for every day. The calendar wheel is adjusted with reference to an index line $e$ upon an index lever $f$ which is pivoted upon the pivot 54. Care must be taken that the roll 53 on the dial bears firmly upon the periphery of the scale cam. It will be noted, by an examination of Fig. 1, that the end of the lever $f$, which bears the scale index line $e$, terminates at the periphery of the roll and is practically in contact with the edge of the cam and flush with the face thereof.

I have already called attention to the fact that the time of the solar year varies from the civil year by five hours, 48 minutes and 46 seconds. Hence, to compensate for this variation between the civil year and the solar year, I provide for an adjustment of the index $a$ by moving the lever $f$ about its pivot so as to advance or withdraw the index. It will be noted that the lever is provided with an arm $g$, in the end of which are spaced notches $h$, which notches bear respectively the legends "Leap year after Feb. 28," "First year after Feb. 28," "Second year after Feb. 28," and "Third year after Feb. 28." The observer on leap year will on the 29th day of February adjust the lever $g$ so that the first notch therein registers with the pin $i$. On the 1st day of March of the next year, the lever is adjusted to cause the engagement of the pin with the second notch, and so on until the lever has been adjusted for four years; after which on the next succeeding leap year, the lever will be replaced to its initial position. By thus moving the lever and the index, the observer in adjusting the calendar wheel will have compensated for the variations between the solar and the civil years.

Figures 10, 16, 17, 18:
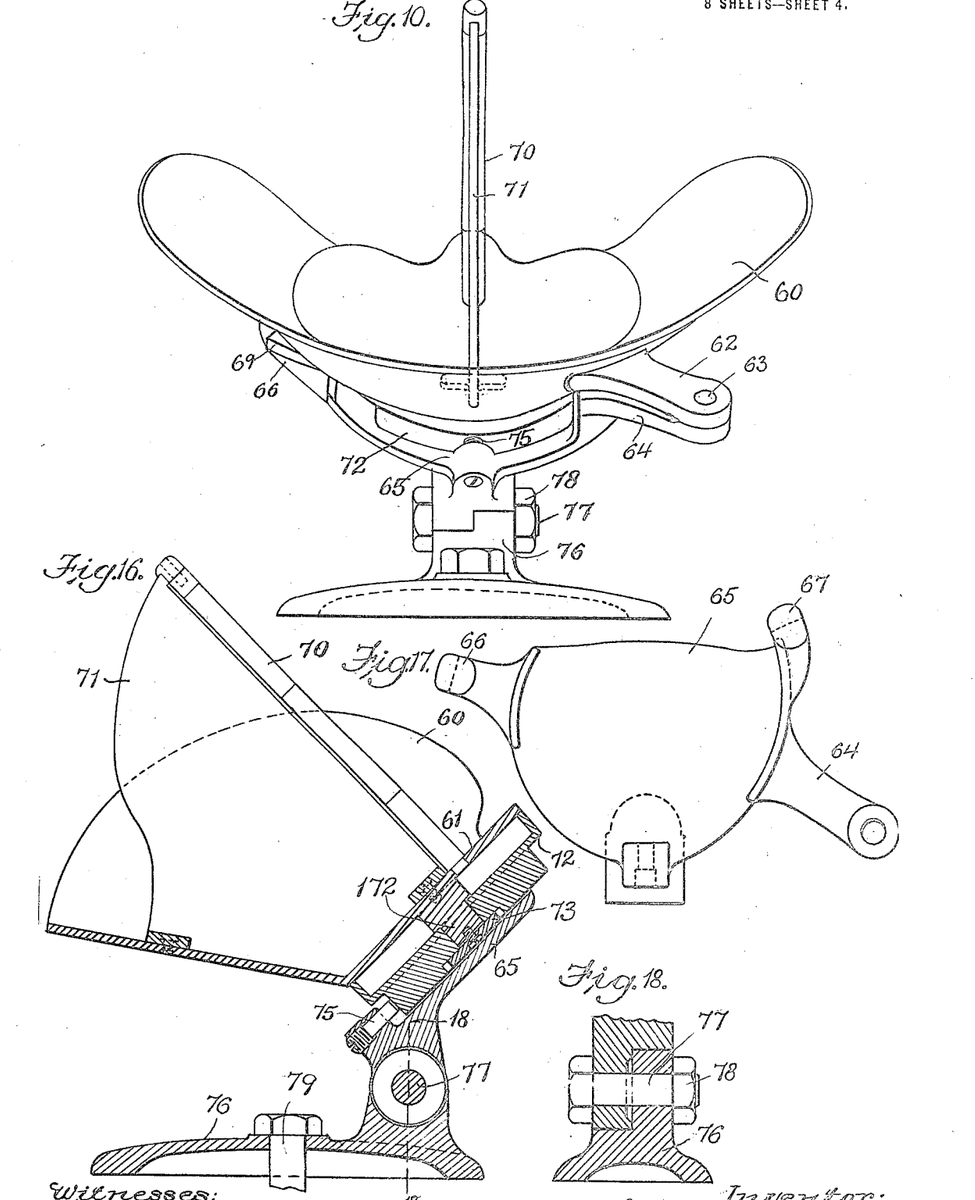
Fig. 10 represents a second embodiment of the invention, shown in front elevation.
Fig. 16 represents a vertical front-to-rear section through the sun dial.
Fig. 17 shows the greater part of the support for the dial.
Fig. 18 represents a section on the line 18—18 of Fig. 16.
Figure 11:
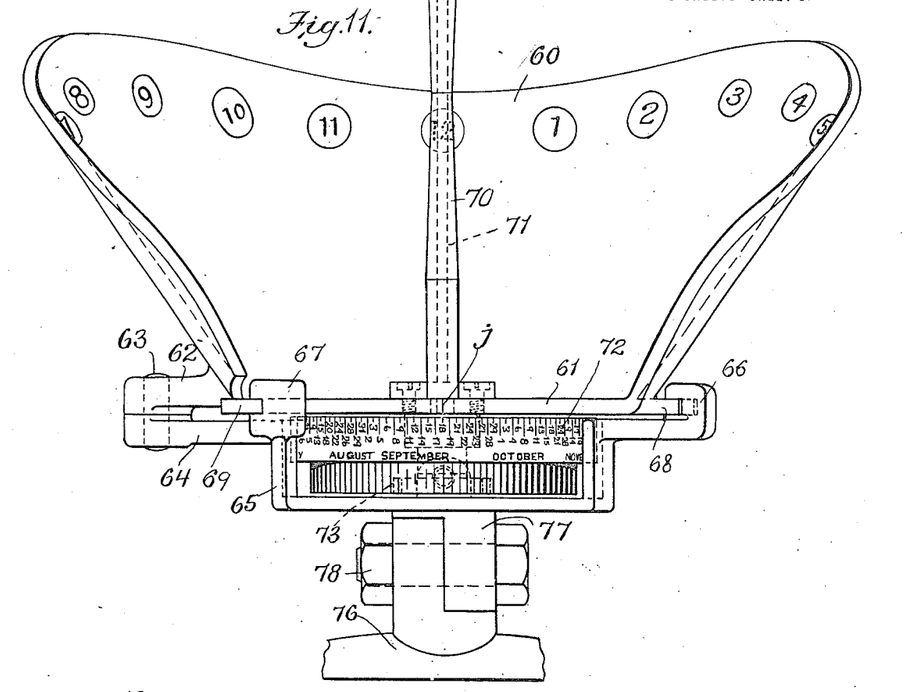
Fig. 11 represents a plan view, looking on a line perpendicular to the gnomon.
Figure 12:
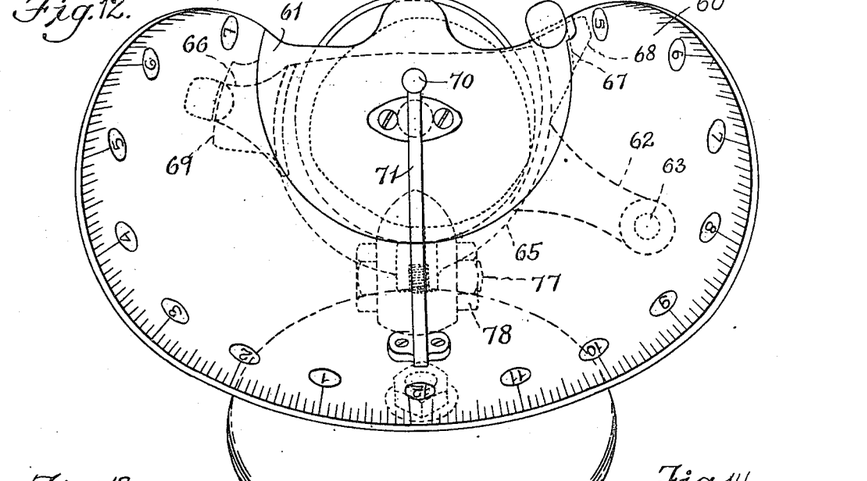
Fig. 12 represents a plan view looking axially of the gnomon.
Figures 13, 14, 15:
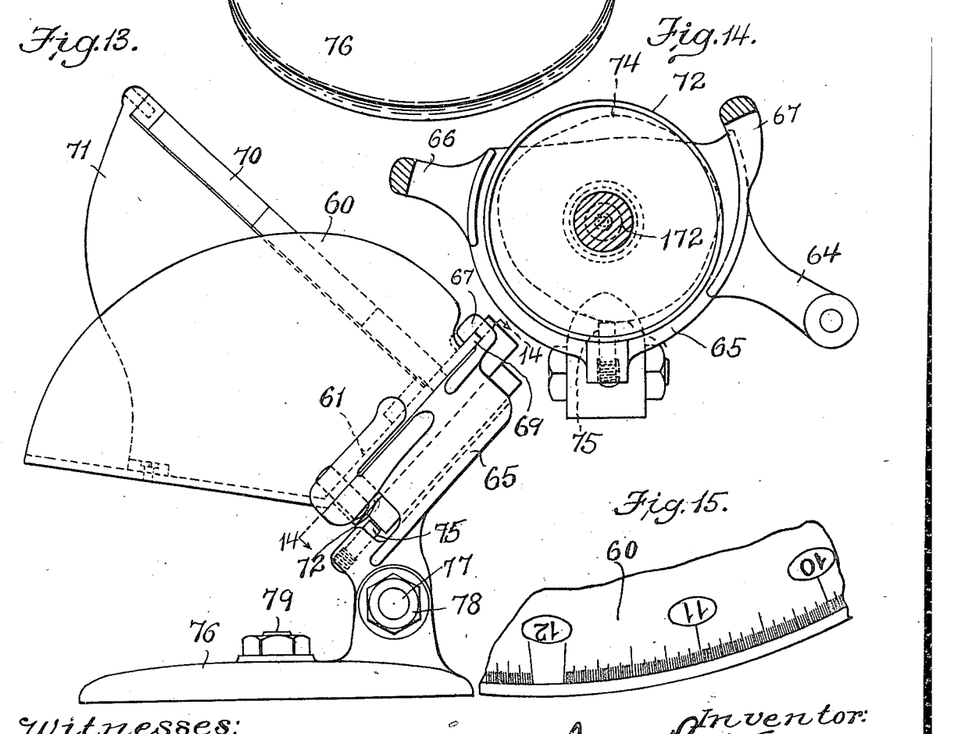
Fig. 13 represents a side elevation.
Fig. 14 represents a section on the line 14—14 of Fig. 13.
Fig. 15 represents a portion of the hour scale.
Figures 19, 20, 21:
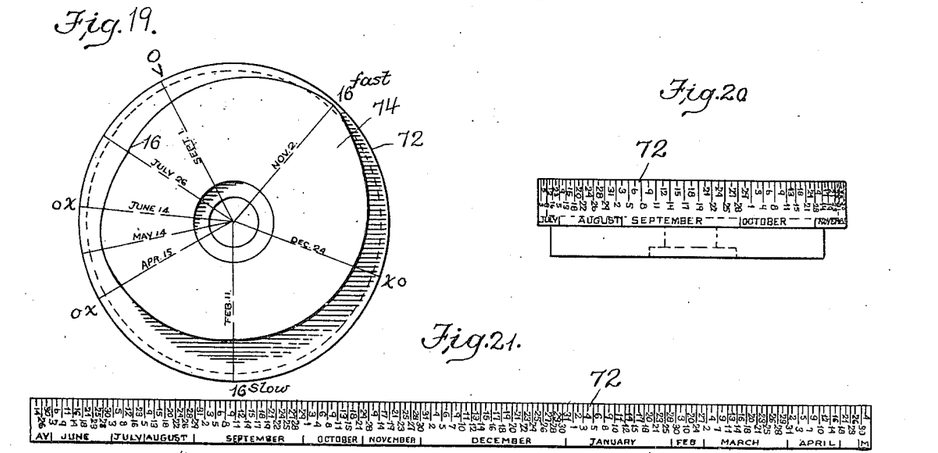
Figs. 19 and 20 illustrate the movable calendar wheel.
Figs. 21 and 22 illustrate the calendar scale on said wheel.
Figure 22:
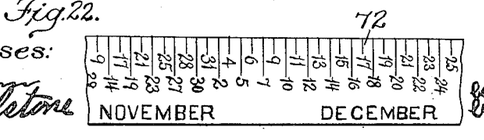

In the embodiment of the invention shown in Figs. 10 to 22 inclusive, the dial 60, which is approximately in the shape of a portion of a frusto-cone, has the flat base 61, with an arm 62, which is pivoted at 63 to an arm 64 extending laterally from the support 65. Said support has guideways formed in arms 66, 67, to receive external flanges or ribs 68, 69 projecting from the base of the dial to prevent the dial from tilting. In the axis of the frusto-cone is located the gnomon 70, from which the web 71 extends to the inner face of the dial. Pivoted to the under side of the base of the dial is a calendar wheel 72 bearing on its periphery a scale having equal graduations indicating differences of one minute, and also bearing the days and months of the year, as shown in Figs. 20, 21 and 22. The base of the dial has an annular boss 172 on which the calendar wheel is held by the disk 73. The said wheel is formed with a cam 74 shaped substantially as shown in Fig. 19 and the periphery of which rests upon the adjustable pin 75 located in the support 65, see Fig. 16. This cam differs from the one previously described in that the calendar wheel has equal graduations indicating variations of one minute in the equation of time, thereby rendering the spacing for the days of the year unequal; whereas, in the previously described cam, the calendar wheel has equal graduations for the days of the year. In the first case, the cam rises through the arcs measured by any two graduations on the scale are equal; whereas in the second cam the rises between the graduations are not equal. The advantage of the first cam is that the variations for compensating for the equation of time are given for all the days of the year *seriatim*, and an adjustment for leap year is provided. The advantage of the second cam is that it may be of small diameter since it has a uniform rise of cam surface for a given angular adjustment, though as a possible disadvantage may be mentioned the fact that it does not easily lend itself to an adjustment for leap year. The index $j$ is formed on the front edge of the dial base and is substantially flush with the periphery of the cylindrical portion of the calendar wheel. From the explanation of the first described sun dial, it will be apparent that from time to time the calendar wheel may be advanced step by step to provide a given angular adjustment of the dial with reference to the gnomon. The support 65 is pivoted to the base member 76 by a transverse bolt 77 and nut 78, and the said members may be secured to a standard or foundation by a pivot member 79.

Figure 23:
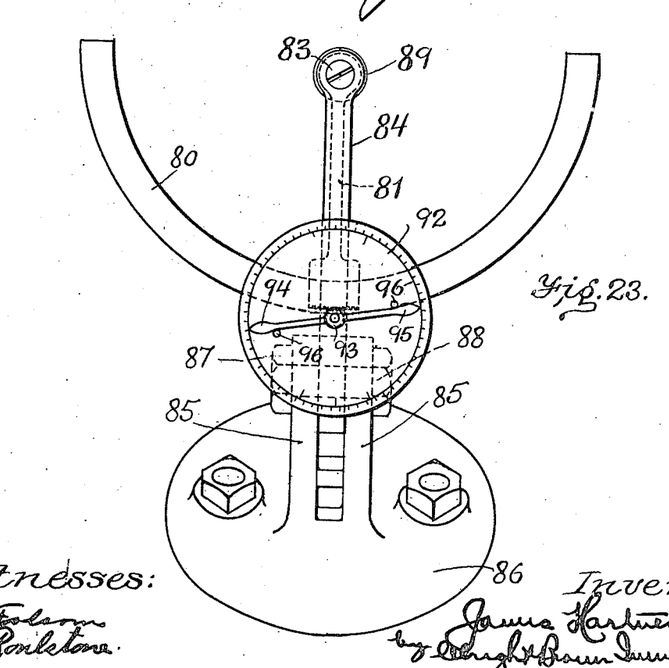
Figs. 23, 24 and 25 illustrate the third form of sun dial embodying the invention, Fig. 25 representing the stationary calendar and movable index.
Figure 24:
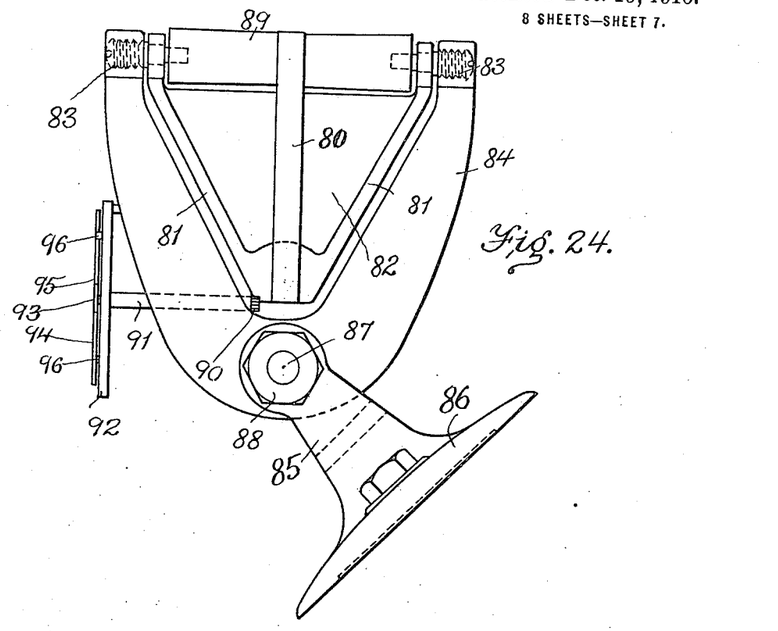
Figure 25:
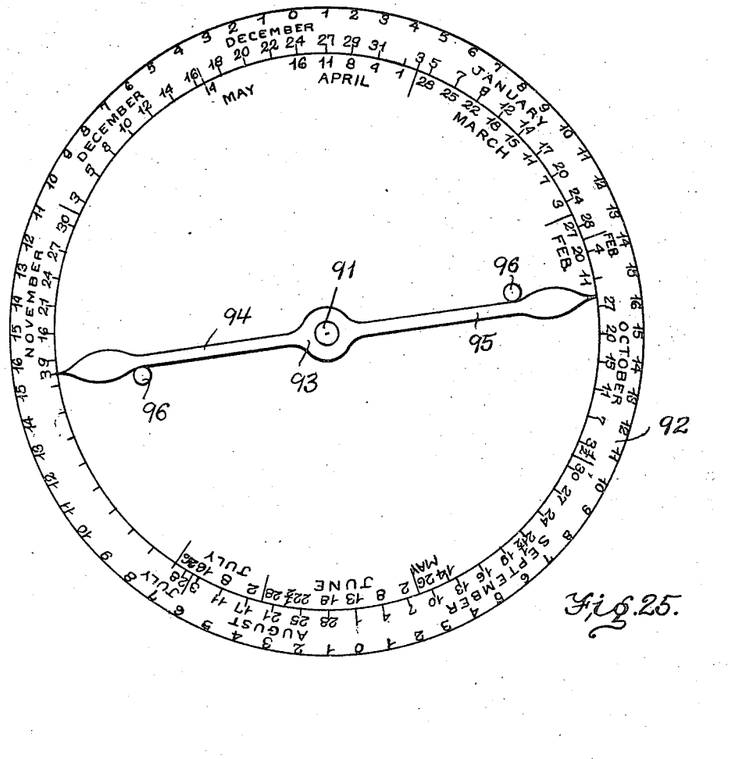

In both of the foregoing embodiments of the invention, the calendar wheel bears a scale having graduations to represent the days and months, and the scale is therefore moved with reference to a stationary index, but it will be apparent that the scale may be stationary and the index may be connected to the calendar wheel so as to move therewith, as shown for example in Figs. 23 to 25 inclusive. In this instance, the dial 80 is semi-cylindrical and midway between its ends is formed or secured to a yoke 81 formed by the divergent arms which are connected by the web 82. The said arms are hung upon screw pivots 83, axially alined with the axis of the dial, and mounted in the ends of a forked support 84. Said support, midway between its ends, is adjustably clamped between ears or lugs 85 rising from a base 86 adapted to be secured upon a column or other foundation. A bolt 87 and nut 88 serve as clamping members to hold the support after adjustment. The gnomon 89 is supported by the screw pivot and is axially alined therewith. In this case the dial is adjusted about its axis, and the axis of the gnomon, by a calendar wheel, which is shown as in the form of a pinion 90, engaging segmental gear teeth formed on the yoke 81. The pinion is on the inner end of a rock shaft 91 journaled in the support 84, and projecting through a dial or scale plate 92 secured to the front of the support. On the front end of the shaft is a double index 93, having pointers 94, 95, which move along a calendar scale formed on the dial. The index may be moved back and forth irregularly to the various dates indicated upon the scale, the pointer 94 coöperating with the upper half of the scale and the pointer 95 with the lower half. Stops 96 prevent the index from making more than half a revolution. It will be apparent that the index might be fixed, in which case the scale plate would be mounted on the shaft or spindle. In this case the semi-rotation of the shaft from stop to stop adjusts the dial to compensate for a total variation in time of approximately 31 minutes; that is, to compensate for an equation of time of approximately 16 minutes fast to approximately 15 minutes slow. On the scale plate are marked equally spaced graduations indicating differences of one minute. This precludes arranging the months and days thereof in sequence, as in the first calendar wheel herein described. Hence on the scale the days of the month are grouped according to the equation of time therefor, but, as they would be crowded together on a semicircle where only one pointer is used, I employ a circular scale plate for convenience and utilize both semi-circles for the dates and hence use two pointers in connection therewith. For example, when the pointers are at zero, they would be positioned for April 16, June 13, September 1 and December 24, two of these dates being marked on one half of the scale plate and two on the other scale plate. The dates could of course be all placed on a semi-circular scale plate with which a single pointer could be used if desired.

I have not shown the hour scale on the main dial, but, like the scales on the dials of the first two described constructions, the width of the spacing of the minutes and hours will depend upon the distance of the gnomon from the dial.

In all of the constructions which I have described, an unskilled or unlearned person may effect the adjustments necessary to compensate for the variation of time, so that the shadow of the gnomon upon the graduated dial will indicate mean time.

What I claim is:—

1. A sun dial having a dial provided with an hour scale, a gnomon arranged to cast a shadow on said scale to indicate time, and means including a calendar wheel for adjusting the dial to compensate for the equation of time.

2. A sun dial having a dial provided with an hour scale, a gnomon arranged to cast a shadow on said scale to indicate time, a fixed support for the dial, and a calendar wheel for adjusting the dial relatively to the support from time to time to compensate for the equation of time.

3. A sun dial comprising a dial provided with an hour scale, a gnomon arranged to cast a shadow on said scale to indicate time, and rotatable adjusting means for adjusting the dial to compensate for the equation of time.

4. A sun dial comprising a dial provided with an hour scale, a gnomon arranged to cast a shadow on said scale to indicate time, a pivot for the dial, and a calendar wheel for adjusting said dial about said pivot to compensate for the equation of time.

5. A sun dial comprising a dial having an hour scale, a gnomon for casting a shadow thereon, a pivot for the dial, and rotatable adjusting means to adjust said dial about its pivot.

6. A sun dial comprising a dial having an hour scale, a gnomon to cast a shadow on said scale to indicate time, a scale representing the year and divisions thereof, and means for adjusting the dial according to said scale to compensate for the equation of time.

7. A sun dial comprising a gnomon, a calendar scale, and a dial having an hour scale on which the gnomon casts a shadow to indicate time, said dial being adjustable according to said scale to compensate for the equation of time and also to compensate for the variation between the civil and the solar year.

8. A sun dial comprising a gnomon, a dial having an hour scale to receive the shadow of the gnomon, a pivot for the dial, and a rotatable calendar wheel for adjusting said dial about said pivot.

9. A sun dial comprising a gnomon, a dial having an hour scale to receive the shadow of the gnomon, a pivot for the dial, an index, and a rotatable calendar wheel for adjusting said dial about its pivot, and bearing a scale representing divisions of the year for coöperation with the index.

10. A sun dial comprising a gnomon, a movable dial having an hour scale to receive the shadow of the gnomon, and a cam for adjusting the dial, said cam being shaped to correspond to the equation of time during a solar year.

11. A sun dial comprising a dial having a flaring wall with an hour scale thereon, a gnomon projecting from said dial to cast its shadow upon the wall, and on the scale to indicate time, and universally adjustable means for supporting said dial and gnomon upon a suitable foundation.

12. A sun dial comprising a dial having an hour scale, a gnomon arranged to cast a shadow on the hour scale, an index, means for adjusting the dial to compensate for the equation of time, including a movable scale for association with said index and representing periods of the year, said index being adjustable with reference to said scale to compensate for variations between the civil and the solar year.

13. A sun dial comprising a support, a dial and a gnomon movably mounted on said support, and a cam and an abutment mounted on said support and dial for positioning the dial, said cam being rotatable and being formed to correspond to the equation of time throughout a year, said cam bearing a calendar scale, and an index for association with said scale.

14. A sun dial comprising a dial having an hour scale formed in two parts, and a tapered gnomon arcuate in cross section for casting a shadow on said scale.

15. A sun dial comprising a dial having an hour scale, a gnomon arranged to cast its shadow thereon, and an index and a calendar scale having means by which, when one is rotated relatively to the other, the dial is angularly adjusted with reference to the gnomon to compensate for the equation of time.

In testimony whereof I have affixed my signature, in presence of two witnesses.

JAMES HARTNESS.

Witnesses:
ALICE A. COLBURN,
HENRY S. BEAL.